United States Patent [19]

Schärer

[11] Patent Number: 5,259,684

[45] Date of Patent: Nov. 9, 1993

[54] CONNECTOR FOR A STRUT-TUBE TO A COLUMN

[75] Inventor: Paul Schärer, Münsingen, Switzerland

[73] Assignee: USM U. Schärer Sohne AG., Munsing, Switzerland

[21] Appl. No.: 768,737

[22] PCT Filed: Jan. 10, 1991

[86] PCT No.: PCT/CH91/00009
  § 371 Date: Oct. 21, 1991
  § 102(e) Date: Oct. 21, 1991

[87] PCT Pub. No.: WO90/10484
  PCT Pub. Date: Sep. 20, 1990

[30] Foreign Application Priority Data

Mar. 2, 1990 [CH] Switzerland .............. 675/90

[51] Int. Cl.⁵ .............................................. F16B 7/04
[52] U.S. Cl. ................................. 403/174; 403/178; 403/217; 403/409.1; 411/80
[58] Field of Search ............... 403/174, 178, 173, 170, 403/177, 217, 297, 374, 409.1, 370; 411/79, 80; 52/263, 648

[56] References Cited

U.S. PATENT DOCUMENTS

| | | | |
|---|---|---|---|
| 2,212,455 | 8/1940 | Reed | 403/170 X |
| 3,912,410 | 10/1975 | Pofferi | 403/170 |
| 3,945,743 | 3/1976 | Koch | 403/297 X |
| 4,089,382 | 5/1978 | Pessier | 403/409.1 X |
| 4,365,907 | 12/1982 | Berry | 403/12 |

FOREIGN PATENT DOCUMENTS

| | | | |
|---|---|---|---|
| 2833428 | 2/1980 | Fed. Rep. of Germany | 403/171 |
| 8813241.2 | 12/1988 | Fed. Rep. of Germany | |
| 215903 | 7/1941 | Switzerland | |
| 429317 | 1/1967 | Switzerland | 403/171 |
| 3377 | 1/1916 | United Kingdom | 411/80 |
| 992542 | 5/1965 | United Kingdom | 411/80 |

Primary Examiner—Randolph A. Reese
Assistant Examiner—Harry C. Kim
Attorney, Agent, or Firm—Brady, O'Boyle & Gates

[57] ABSTRACT

In the process proposed, tubular struts (3a to 3d) are detachably connected to a column (1) using a connection device, wedge element pairs (5a to 5d) on the connection device being inserted in the struts (3a to 3d) and the wedge elements (23, 24) of the wedge element pairs (5a to 5d) being displaced longitudinally with respect to each other by screws (13, 17a, 17c) which pass through holes (12a to 12d) in the column wall and through a throughbore (11a to 11d) in each wedge element pair (5a to 5d). The wedge elements (23, 24) of each wedge element pair (5a to 5d) are thus pressed against the inside walls of the struts (3a to 3d). The heads (27a to 27d) of the screws are located outside the column (1). The column (1) is reinforced by an internal core (7) and the shape of the end (39) of one (24) of the wedge elements in each pair matches that of the outside wall of the column (1). The core (7) in the column (1) and the end (39) of the wedge element (24) lying flush against the outside wall of the column (1) permit high flexural and shear forces to be transmitted by the struts (3a, 3b, 3c, 3d) to the column (1) owing to the large force-transmission surfaces and the reinforcing action of the core, as well as the distribution of the forces over a large area of the column by the core (7). Two struts or two pairs of struts can be attached to the column (1) opposite each other at the same height.

11 Claims, 3 Drawing Sheets

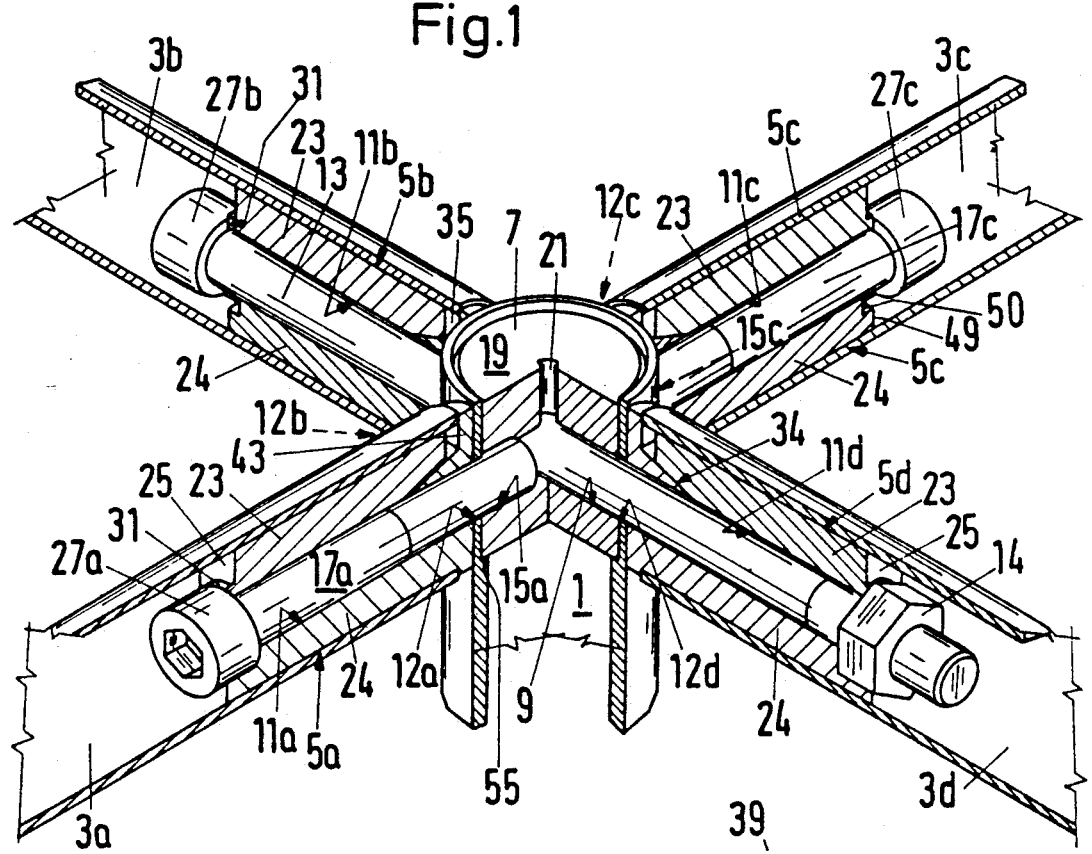
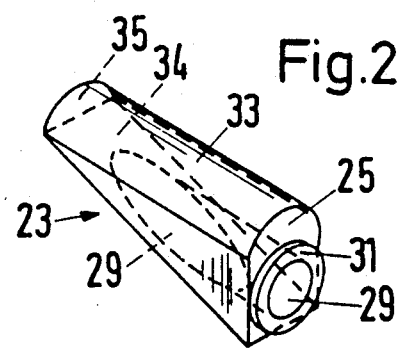
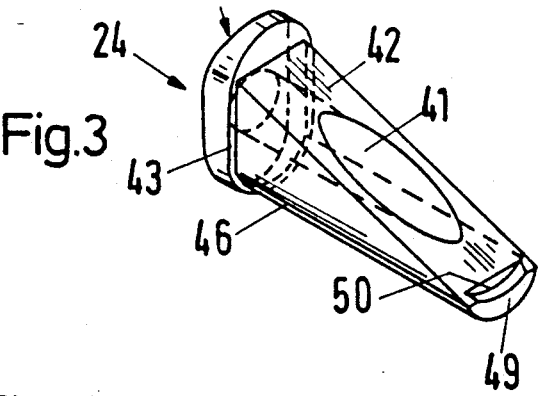
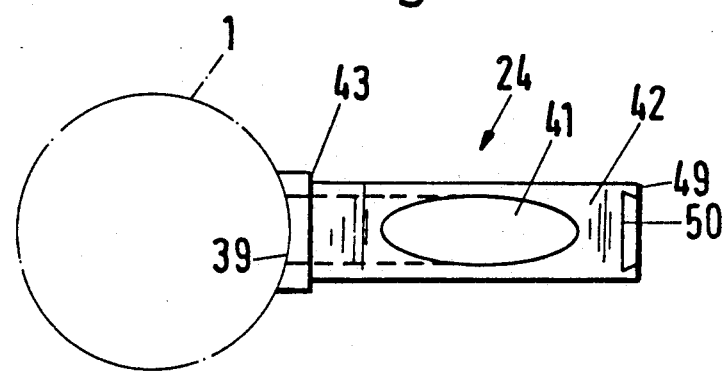
Fig.1
Fig.2
Fig.3
Fig.4

CONNECTOR FOR A STRUT-TUBE TO A COLUMN

BACKGROUND OF THE INVENTION

The invention relates to a process for the detachable attachment of a tubular strut to a column to a connecting element for performing the process and to a connection of a tubular strut with a column by means of a connection device.

A connection device for connecting a column to a tubular strut has been known from U.S. Pat. No. 4,365,907. In the conventional connection device, a rectangular tubular strut is connected to a rectangular tubular column with the aid of a central wedge element provided with a threaded through bore as well as two lateral wedge elements pressed by the central element against the inner wall of the strut. The three wedge elements are joined by a deformable strip. On the outer wall of the column, a base plate is arranged on which rests, in turn, the end face of one end of the strut. The base plate is pinned to the column. At the mounting site of the strut, the column is equipped diametrically with two bores. A screw can be passed with its head through the bore lying in opposition to the mounting site, the head then being in contact with the rim of the bore of the other bore. For establishing the connection of strut and column, the screw is passed into the column, the base plate is placed on the screw on the outside of the column, and the screw is threaded into the central wedge element. Subsequently, the strut is pushed over the wedge elements, and the screw is tightened; during this step, the central wedge element is pulled against the column and thereby the two lateral wedge elements are urged against the inner wall of the strut. There is no possibility for mounting two opposed struts at the same level.

In a connection of a column with a strut of a different type, as disclosed in Swiss Patent 429,317, the connecting element in each case consists of respectively one wedge element pair which can be inserted in the tube ends of the column as well as of the strut to be joined together, and of a head with threaded bores. The wedge elements are pulled against the head by means of a screw threadable into the thread in the head whereby the wedge elements are pressed against the inner wall of the strut and, respectively, of the column. In the connection, which is not of the type under consideration herein, only tube ends can be joined. If it is intended to attach two opposed struts to a column, then the column must be cut to the length corresponding to the level of mounting of the two struts.

SUMMARY OF THE INVENTION

It is an object of the invention to avoid the drawbacks of the conventional connection devices, and also to provide a connection between column and strut which can be established in a simple way and which transmits high flexural and shear forces.

The attainment of this object with respect to the process for the detachable connection of a tubular strut to a column with respect to the connection device for performing the process and with respect to the connection is set forth hereinafter following in greater detail.

Examples of the connection device according to this invention and of the connection in accordance with the invention will be described in greater detail below with reference to drawings wherein:

BRIEF DESCRIPTION OF THE DRAWINGS

FIG. 1 is a perspective sectional view of a connection of four struts to a column by means of a connection device consisting of a core inserted in the column and four wedge element pairs, the wedge elements of which are axially displaceable with respect to one another by means of a screw, FIG. 2 shows a perspective view of a wedge element of the wedge element pair utilized in FIG. 1, FIG. 3 shows a perspective view of the other wedge element of the wedge element pair utilized in FIG. 1, FIG. 4 is a top view of the wedge element illustrated in FIG. 3.

DESCRIPTION OF THE PREFERRED EMBODIMENTS

Figure 7:
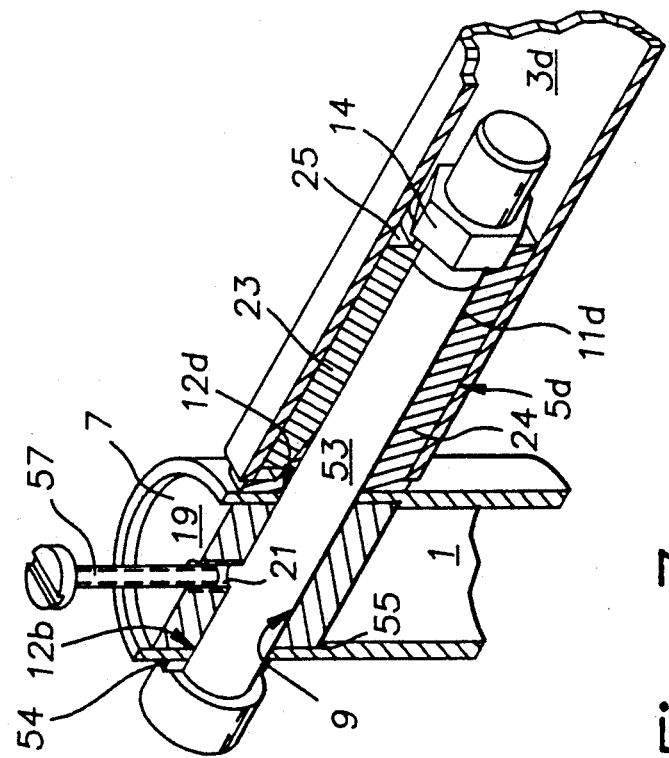
FIG. 7 is a view similar to FIG. 5 and showing the screw for holding the core in position inside the column during assembly and dismantling.

In the connection of a column 1 with four tubular struts 3a–3d of oval cross section, shown in FIG. 1, the connecting element has four wedge element pairs 5a–5d as wedge element sets, a core 7 within the column 1 as the force-exerting member, and a long cylindrical screw 13 with a hexagon socket head and a nut 14. The cylindrical screw 13 extends through a through bore 9 in the core 7, through respectively one through bore 11b and 11d in the opposite wedge element pairs 5b and 5d in the struts 3b and 3d, and through two opposite holes 12b and 12d in the column wall. Respectively two short cylinder screws 17a and 17c, likewise with a hexagon socket head, extend through respectively one through bore 11a and 11c of the wedge element pairs 5a and 5c, and a hole 12a and, respectively, 12c in the column wall, and are threaded into respectively one threaded bore 15a (visible in FIG. 1) and 15c (not visible in FIG. 1). The core 7 has a cross section which is adapted to the interior of the column 1 except for a clearance tolerance. From its topside 19, as a coupling means for a holding element, a central threaded bore 21 emanates; a screw 57, FIG. 7 can be threaded into this bore and functions as a holding element in order to insert and hold the bores 9, 15 and 15c in the core 7 in alignment with the holes 12b, 12d, 12a and 12c in the column wall during the connection assembly at the site of connection in the column 1. The axes of the two threaded bores 15a and 15c are disposed in the core 7 perpendicularly to and at the same level as the through bore 9. The holes 12a–12d in the column 1 are designed to align with the through bore 9 as well as to the threaded bores 15a and 15c. The oval inner cross section of the struts 3a–3d and the diameter of the nut 14, measured between two parallel lateral surfaces as well as between two radially opposite lateral corners, are dimensioned so that although the respective strut 3a, 3b, 3c, or 3d can be placed over the nut 14 seated on the screw 13 the nut 14 cannot be turned within the inner space of the respective strut 3a, 3b, 3c, or 3d (here 3d).

Each of the four wedge element pairs 5a–5d consists of respectively two wedge elements 23 and 24 wherein the screw head 27a and 27c, respectively, adjoins the screw 17a and 17c, respectively, the screw head 27b adjoins the screw 13, and the nut 14 adjoins the end face 25 of the wedge element 23. The wedge element 23 illustrated in FIG. 2 has a through bore 29 extending perpendicularly to the end face 25, this bore being part of the through bores 11a, 11b, 11c, or 11d of the wedge element pairs 5a, 5b, 5c, or 5d and having a diameter that is larger by a tolerance than the shank diameter of the screws 13, 17a and 17c. An annular extension 31 machined to be planar is arranged around the outlet of the through bore 29 on the end face 25, this extension affording a perfect contacting of the respective screw heads 27a, 27b, 27c and, respectively, the nut 14. The extension 31 is provided to avoid machining of the entire end face 25. A curved lateral surface 33 extends at a right angle to the end face 25, the curvature of this lateral surface being adapted to the inner curvature of the strut 3 in the intended supporting zone. On the side located oppositely to the lateral surface 33, the wedge surface 34 extends at an acute angle with respect to the end face 25 and to the line of symmetry of the curved lateral surface 33. The intersecting edge between the end face 25 and the wedge surface 34 is a straight line. The wedge element 23 is truncated at its tip with a frontal surface 35 in parallel to the end face 25.

The wedge element 24, illustrated in FIG. 3 in a perspective view and in FIG. 4 in a top view, exhibits, in contrast to the wedge element 23, a curved end face 39, the curvature of which, as shown in FIG. 4, is adapted to the curvature of the wall of column 1. A through bore 41 extends from the center of the end face 39 and has the median perpendicular of the end face 39 as the axis. The through bore 41 is part of the through bore 11a, 11b, 11c, or 11d of the wedge element pair 5a, 5b, 5c, or 5d, and has a diameter larger than the diameter of the through bore 29 of the wedge element 23. The forward portion of the wedge element 24 carrying the end face 39 is broadened with respect to the remaining portion carrying the wedge surface 42 in such a way that an extension 43 is formed on which rests the front side of the end of the respective strut 3a, 3b, 3c, or 3d facing the column 1. The broadened region forming a shoulder, as visible in FIG. 1, is, for esthetic reasons, smaller by one tolerance than the cross section of the strut 3a, 3b, 3c, or 3d. A curved lateral surface 46 adjoins, at a right angle, the supporting surface for the strut 5a, 5b, 5c, or 5d of the extension 43; the curvature of this curved lateral surface is adapted to the internal curvature of the strut 3a, 3b, 3c, or 3d in the intended supporting zone. On the side in opposition to the lateral surface 46, the wedge surface 42 extends at an acute wedge angle with respect to the center line of the curved supporting surface. The wedge element 24 is truncated at its tip with a frontal surface 49 wherein a depression 50 is provided on the side of the entering wedge surface 42. The depression 50 prevents contact of the nut 14 at the frontal surface 49 when the connection device is assembled.

In order to establish the connection, shown in FIG. 1, of the four struts 3a, 3b, 3c, and 3d with the column 1, the wedge element pair 5b is placed on the cylindrical screw 13 in such a way that the extension 31 of the wedge element 23 is in contact with the screw head 27b of the screw 13. Subsequently, a screw 57, carrying a nut, not illustrated, threaded onto its shank, is partially threaded into the threaded bore 21 of the core 7 and tightened with the nut, the core 7 is held by the screw and is placed into the interior of the column 1 in such a way that the through bore 9 of the core 7 is in alignment with the holes 12b and 12d in the column wall. The screw 13 is passed through the hole 12b, the through bore 9, and the hole 12d, the wedge element pair 5d is pushed first with the wedge element 23 onto the screw 13, and the nut 14 is threaded in place. The wedge element 23 can be disposed at the top, as shown in FIG. 1, but it can also lie at the bottom without impairing its functioning ability. Thereafter the two struts 3b and 3d are pushed over the wedge element pairs 5b and 5d, and the screw 13 is slightly tightened by means of a long hexagon socket wrench through the strut 3b. The nut 14 cannot rotate within the strut 3d, in accordance with the above remarks.

The screws 17a and 17c are passed through the respective wedge element pairs 5a and 5c in such a way that the extension 31 of the wedge element 23 is in contact with the screw head 27a and 27c, respectively. Then the screws 17a and 17c are passed through the holes 12a and 12c in the column 1 and threaded into the threaded bores 15a and 15c in the core 7. The struts 3a and 3c are pushed over the wedge element pairs 5a and 5c until they abut, with the front side of their ends, against the supporting surface of the respective extension 43. By means of the long hexagon socket wrench mentioned above, the screws 17a and 17c are tightened through the struts 3a and 3c, and the screw 13 is retightened. The screw 57 in the threaded bore 21 in the core 7 is again unthreaded. Due to the firm tightening, the wedge elements 23 and 24 slide axially toward each other on their wedge surfaces 34 and 42 whereby they are urged apart with their curved lateral surfaces 33 and 46 against the inner wall of the struts 3a-3d. At the same time, the struts 3a-3d are pulled against the supporting surfaces of the extensions 43 of the wedge elements 24, and thereby their end faces 39 are urged flush against the wall of the column 1 whereby an excellent connection is established between the struts 3a-3d and the column 1. The core 7 inserted in column 1 and the end face 39 of the wedge element 24, in flush contact with the outer wall of column 1, permit an extensive transmission of flexural and shear forces from the struts 3a, 3b, 3c, and 3d to the column 1, on account of the large force-transmitting surfaces and the rigidification and force distribution over a large column area by the core 7. The connection described here furthermore permits, in contrast to the connection known from U.S. Pat. No. 4,365,907, the mounting of two opposed, or pairs of respectively two opposed struts to the column 1. As contrasted to the known connection wherein the screw for the central wedge can drop into the column during the course of the connection assembly, a dropping of connecting elements into the column 1 is precluded in the connection according to this invention.

Figure 6:
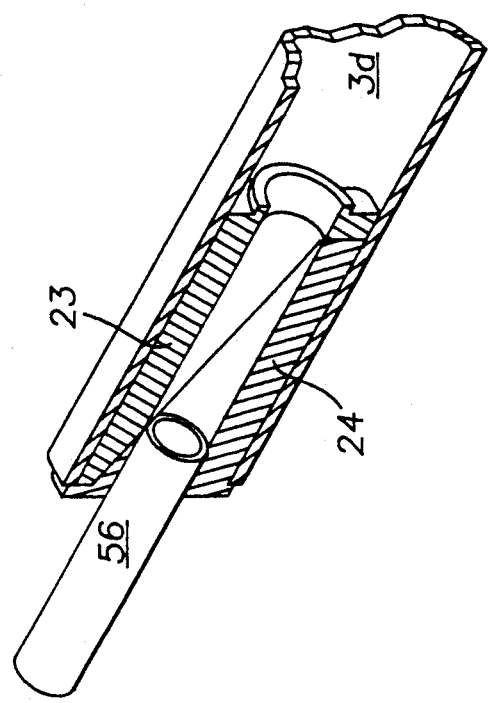
FIG. 6 is a longitudinal cross-section perspective view illustrating a mandrel positioned for releasing the wedge-elements from a strut.

In order to release the connection, the procedure is performed in a chronologically reversed mode of operation from that discussed above. Due to the acute wedge angle of the wedge surfaces 34 and 42 with respect to the center line of the curved surfaces 33 and 46, the wedge elements 23 and 24 frequently jam in the struts 3a, 3b, 3c and 3d, respectively, even after release of the screws 13, 17a and 17c. Here, a cylindrical mandrel 56, FIG. 6, the diameter of which is smaller by a clearance tolerance than the diameter of the through bore 41 but larger than the diameter of the through bore 29, is introduced into the through bore 41 of the wedge element 24 from the curved end face 39 until the mandrel 56 abuts against the rim of the through bore 29. With a vigorous hammer strike on the end of the mandrel 56, both wedge elements 23 and 24 in the respective strut 3a, 3b, 3c, and 3d can be detached from each other.

Instead of the depression 50 in the frontal surface 50 of the wedge element 24, the latter can also be shortened by the depth of the depression 49.

Figure 5:
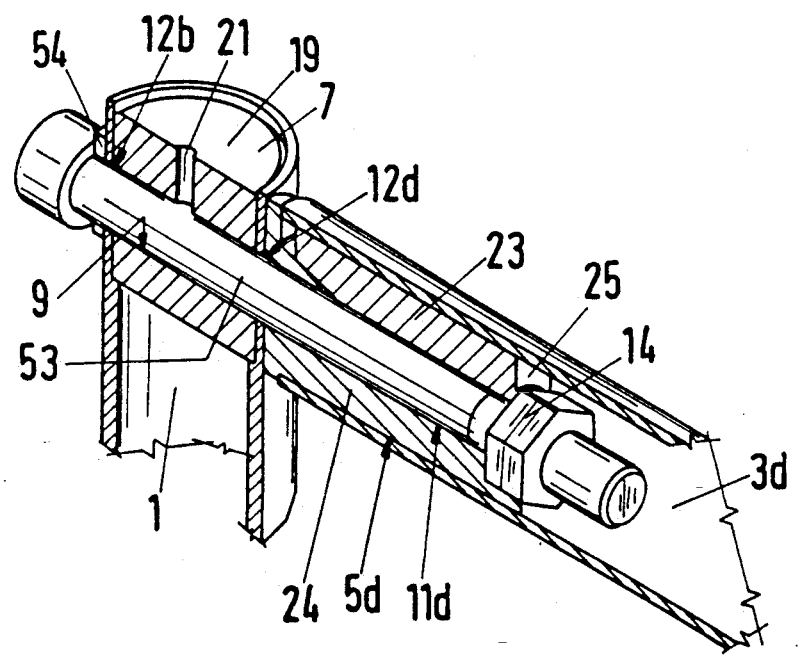
FIG. 5 is a perspective view of a modification of a connection of a strut to the column.

Instead of connecting four struts 3a, 3b, 3c, and 3d to the column 1, it is possible to mount only three, two, or merely one strut or struts. A connection with only one strut 3d is illustrated in FIG. 5. In this arrangement, a cylindrical screw 53 is employed which has approximately half the shank length of the cylindrical screw 13. The core 7 is introduced into the column 1, and the through bore 9 is aligned with respect to the holes 12b and 12d in column 1. A shim 54 is pushed onto the screw 53, and the screw 53 is passed through the hole 12b in the column wall, through the through bore 9 of the core 7, through the hole 12d in the column wall, and through the through bore 11d of the wedge element pair 5d analogously to the above description, and also the nut 14 is threaded onto the end of the screw 53. Subsequently, the strut 3d is pushed over the wedge element pair 5d, and the screw 53 is tightened by means of a hexagon socket wrench.

Instead of arranging the threaded bores 15a and 15c perpendicularly to the through bore 9, these bores can also be arranged at a different angle; analogous remarks apply with regard to the fitting holes 12a through 12d in the column wall. Depending on the thickness of column 1 and the dimensions of the struts 3a, 3b, 3c, or 3d, it is also possible to arrange more than three bores 9, 15a, 15c.

In place of a core 7 insertable in the column 1, a solid column can likewise be used, although machining of the latter is expensive.

Instead of using screws 13, 17a and 17c as the force-exerting member for displacing the wedge elements 23 and 24 axially with respect to each other and for pressing these wedge elements, on account of the force-reinforcing action by the inclined plane of the wedge surfaces 34 and 42, with great force against the inner wall of the struts 3a, 3b, 3c, or 3d, it is also possible to utilize a spring-loaded bolt, not shown, in each case, this bolt engaging into a bayonet catch in the column which is not illustrated. The force of the spring in this arrangement urges the wedge element 23 against the wedge element 24. This connection can be established quickly, it is true, but does not result in the high force transmission from the strut to the column, as in the aforedescribed arrangement.

In place of the threaded hole 21 in the core 7 for insertion of the screw 57, a hook or a retaining pin can also be firmly mounted to the top-side 19 of the core 7 as a coupling means for a holding element. Also, in place of the threaded hole 21, a through hole can be provided in which a hook is inserted for holding the core 7 during assembly.

Instead of retaining the core 7 during the connection assembly, for example, at the screw threaded into the threaded bore 21, it is also possible to recess a shoulder 55 in the inner space of the column 1, as illustrated in FIG. 1, the core 7 resting on this shoulder. This shoulder 55 makes it impossible for the core 7 to slide inwards, but represents a higher production expense as compared with the screw threaded into the threaded bore. From the column 1, the core 7 can be removed again when the connection is released, by threading a screw 57 into the threaded bore 21 or by means of a hook engaging into the threaded bore 21.

I claim:

1. A connecting device for detachably attaching a tubular round strut-tube (3a, 3b, 3c, 3d) to a connecting-region surface of a round column (1), comprising
   a wedge-element pair (5a, 5b, 5c, 5d), a tension member (13, 17a, 17c; 53), a first and a second bearing members acting together with said tension member,
   said first bearing member being an enlarged end part of said tension member,
   said second bearing member being an individual element separated from said wedge-element pair,
   said strut-tube (3a, 3b, 3c, 3d) having an inner hollow space surrounded by an inner surface of a tube wall and open to a tube end,
   said wedge-element pair having dimensions for putting it partly into said inner hollow space,
   said round column (1) having at least one wall opening in said connecting-region surface of said column,
   said wedge-element pair (5a, 5b, 5c, 5d) comprising a first wedge-element and a second wedge-element, each with a smooth axial bore aligned with each other, and each having a first and a second wedge-faces,
   said first wedge-faces being inclined to said axial bores and in sliding contact with each other,
   said first wedge-element having a third surface surrounding the end of said axial bore and abutting against said connecting-region surface of said column,
   said second wedge-face of said first wedge-element being approximately perpendicular to said third surface and partly contoured to the contour of and in contact with said inner surface of said inner hollow space of the strut-tube,
   said second wedge-element having a fourth surface surrounding the other end of said axial bore and being adapted for contacting said first bearing member when said tension member is situated inside said axial bore,
   said second wedge-face of said second wedge-element being approximately perpendicular to said fourth surface and partly contoured to the contour of and in contact with said inner surface of said inner hollow space of the strut-tube,
   the cross-section of said axial bore of said first wedge-element being larger than the cross-section of said axial bore of said second wedge-element to form a release connection,
   whereby after releasing the connection of said connecting device between said strut-tube and said column, tool means having a cross-section smaller than the cross-section of said axial bore of said first wedge-element (24), but larger than the cross-section of said axial bore (29) of said second wedge-element (23), is inserted in said axial bore of said first wedge-element, and impacted against said second wedge-element to detach said second wedge-element from said first wedge-element thereby releasing said wedge-element pair (5a, 5b, 5c, 5d) jammed in the inner hollow space of the strut-tube.

2. A connecting device according to claim 1, in which said first wedge-element (24) having an enlarged extension (43) between said third surface and said first wedge-face which has a supporting shoulder for the end face of the end of said strut-tube (3a, 3b, 3c, 3d) facing toward said first wedge-face.

3. A connecting device according to claim 1, in which said round column is at least partly hollow with an inner bore formed by a surrounding wall of said column and having an open end,
- a core (7) inserted into said inner bore through the open end of said column,
- means coupled with said core and forming a holding element for retaining said core (7) in position in said inner bore of said column (1) so that it will not drop into said inner bore during attachment of the connecting device.

4. A connecting device according to claim 3, in which said means coupled with said core comprises a threaded hole (21) in said core extending toward the open end of said column, and a holding element connected in said threaded hole.

5. A connecting device according to claim 4, in which said holding element is a screw element threaded in said threaded hole.

6. A connecting device according to claim 1, in which
- said round column having a column wall defining an inner bore, a wall opening in said column wall,
- said first bearing member enlarged end part rests on said fourth surface of said second wedge-element,
- said tension member passing through said smooth axial bores of said first and said second wedge-elements and entering said wall opening in said column,
- said first wedge-element, said second wedge-element and said tension member being situated partly within said inner hollow space of said strut-tube, and
- said tension member pressing said first wedge-element against said second wedge-element and said third surface of said first wedge-element against said connecting-region surface of said round column, and said second wedge-faces of said first wedge-element and said second wedge-element against said inner surface of said inner hollow space of said strut-tube by pressing both said first wedge-element and said second wedge-element radially by the effect of the sliding contact of the inclined first wedge-faces.

7. A connecting device according to claim 6, in which said column has an open end and said inner bore extending at least to the connecting-region surface of said round column,
- a core (7) having a cross-section adapted to fit into said inner bore of said column,
- said core being positioned in said inner bore juxtaposed said connecting-region surface, and
- said tension member (17a; 17c; 13; 53) passing through said axial bore (11a, 11b, 11c, 11d) of said wedge-element pair (5a, 5b, 5c, 5d) and said wall opening of said column connected in said core (7) as said second bearing member.

8. A connecting device according to claim 6, in which said tension member comprises a threaded screw and said second bearing member comprises a nut (14) threaded on said screw, and
- said nut (14) having a cross-section dimensioned to the cross-section of said inner hollow space of said strut-tube whereby said nut (14) is longitudinally displaceable in said inner hollow space of said strut-tube but is not rotatable in said inner hollow space.

9. A connecting device according to claim 1, in which said round column having a column wall defining an inner bore, opposed wall openings in said column wall,
- one of said first bearing member or second bearing rests on said fourth surface of said second wedge-element, and one of said second bearing member or first bearing member rests on said column wall at one of said opposed wall openings,
- said tension member passing through said smooth axial bores of said first and said second wedge-elements and through said opposed wall openings in said column,
- said first wedge-element, said second wedge-element and said tension member being situated partly within said inner hollow space of said strut-tube, and
- said tension member pressing said first wedge-element against said second wedge-element and said third surface of said first wedge-element against said connecting region surface of said round column, and said second wedge-face of said first wedge-element and said second wedge-element against said inner surface of said inner hollow space of said strut-tube by pressing both said first wedge-element and said second wedge-element radially by the effect of the sliding contact of the inclined first wedge-faces.

10. A connecting device according to claim 9, in which said column has an open end and said inner bore extending at least to the connecting-region surface of said round column,
- a core (7) having a cross-section adapted to fit into said inner bore of said column and having a smooth transverse bore therethrough,
- said core being positioned in said inner bore juxtaposed said connecting-region surface with said transverse bore in alignment with said opposed wall openings, and
- said tension member (17a; 17c; 13; 53) passing through said axial bore (11a, 11b, 11c, 11d) of said wedge-element pair (5a, 5b, 5c, 5d), said opposed wall openings of said column, and said transverse bore in said core (7), and facing said second bearing member and said first bearing member connected at opposite ends thereof.

11. A connecting device according to claim 1, in which said round column having an open end and a column wall defining an inner bore extending at least to the connecting-region surface of said column, opposed wall openings in said column wall,
- a core (7) having a cross-section adapted to fit into said inner bore of said column and having a smooth transverse bore therethrough,
- said core being positioned in said inner bore juxtaposed said connecting-region surface with said transverse bore in alignment with said opposed wall openings,
- said first wedge-element, said second wedge-element and said tension member being situated partly within said inner hollow space of said strut-tube,
- a second strut-tube having an inner hollow space and an open tube end,
- a second wedge-element pair similar to said first mentioned wedge-element pair inserted partly into said inner hollow space of said second strut-tube, and comprising a third wedge-element and a fourth wedge-element, each with a smooth axial bore aligned with each other, and each having said first and second wedge-faces, said third wedge-element having a third surface surrounding the end of said axial bore and abutting against said connecting-region surface of said column, said fourth wedge-element having a said fourth surface surrounding the other end of said axial bore for contacting said second bearing member, said first bearing member rests on said fourth surface of said second wedge-element of said first mentioned wedge-element pair, and said second bearing member rests on said fourth surface of said fourth wedge-element of said second wedge-element pair, said tension member (17a; 17c; 13; 53) passing through said axial bores (11a, 11b, 11c, 11d) of said first mentioned wedge-element pair and said second wedge-element pair (5a, 5b, 5c, 5d), said opposed wall openings of said column, and said transverse bore in said core (7), said tension member having said first bearing member connected on one end thereof, and said second bearing member connected to the opposite end thereof, and said tension member pressing said first wedge-element against said second wedge-element, pressing said third wedge-element against said fourth wedge-element, and said third surfaces of said first wedge-element and said third wedge-element against said connecting-region surface of said round column; and said second wedge-faces of said first wedge-element, said second wedge-element, said third wedge-element and said fourth wedge-element against said inner surface of said inner hollow space of said first mentioned strut-tube and said second strut-tube, by pressing both said first wedge-element and said second wedge-element, and said third wedge-element and said fourth wedge-element, radially by the effect of the sliding contact of the inclined first wedge-faces.

* * * * *